United States Patent [19]

Kohler

[11] Patent Number: 4,878,336
[45] Date of Patent: Nov. 7, 1989

[54] CONTROL DEVICE ON A PACKAGING MACHINE FOR SINGLE OR MULTIPLE PACKAGING OF HANGING ARTICLES OF CLOTHING

[75] Inventor: Donald Kohler, Melle, Fed. Rep. of Germany

[73] Assignee: Wilfred Pavel Maschinenbau, Fed. Rep. of Germany

[21] Appl. No.: 167,932

[22] Filed: Mar. 14, 1988

[30] Foreign Application Priority Data

Nov. 5, 1987 [DE] Fed. Rep. of Germany ....... 3737484

[51] Int. Cl.$^4$ ...................... B65B 57/20; B65B 65/08; B65B 9/13; B65B 43/12
[52] U.S. Cl. ........................................ 53/500; 53/501; 53/567; 53/256
[58] Field of Search .................. 53/52, 500, 501, 256, 53/567; 209/551; 198/431, 341, 340

[56] References Cited

U.S. PATENT DOCUMENTS

| | | | |
|---|---|---|---|
| 2,751,059 | 6/1956 | Klein et al. ...................... | 198/431 X |
| 2,902,138 | 9/1959 | Oelkers ............................... | 198/340 |
| 3,407,916 | 10/1968 | Engeler ............................... | 198/431 |
| 3,503,176 | 3/1970 | Crane ................................. | 53/256 X |
| 3,755,652 | 8/1973 | Endo et al. ...................... | 198/340 X |
| 3,755,984 | 9/1973 | Vanderpool ............................ | 53/52 |
| 3,820,498 | 6/1974 | Bosshard .......................... | 198/340 X |
| 4,148,391 | 4/1979 | Stobb .................................. | 198/431 |
| 4,394,896 | 7/1983 | McComas et al. ................... | 198/341 |

FOREIGN PATENT DOCUMENTS 2239384 2/1975 France ................................. 53/256

Primary Examiner—Horace M. Culver
Attorney, Agent, or Firm—William A. Drucker

[57] ABSTRACT

A control device on a packaging machine for single and multiple packaging of articles of clothing hanging on coat hangers and to be jacketed and welded in a tube film of plastics material in which in the region of the running path of the articles of clothing between the feed screw and the packaging suspension device there are arranged a singler and a stopper arranged at a distance therefrom as well as a scanner registering the number of clothing articles to be packaged by preselection with magnetic scanning, by color scanning or by distance scanning and controlling the singler and stopper for packaging preparation and release.

11 Claims, 2 Drawing Sheets

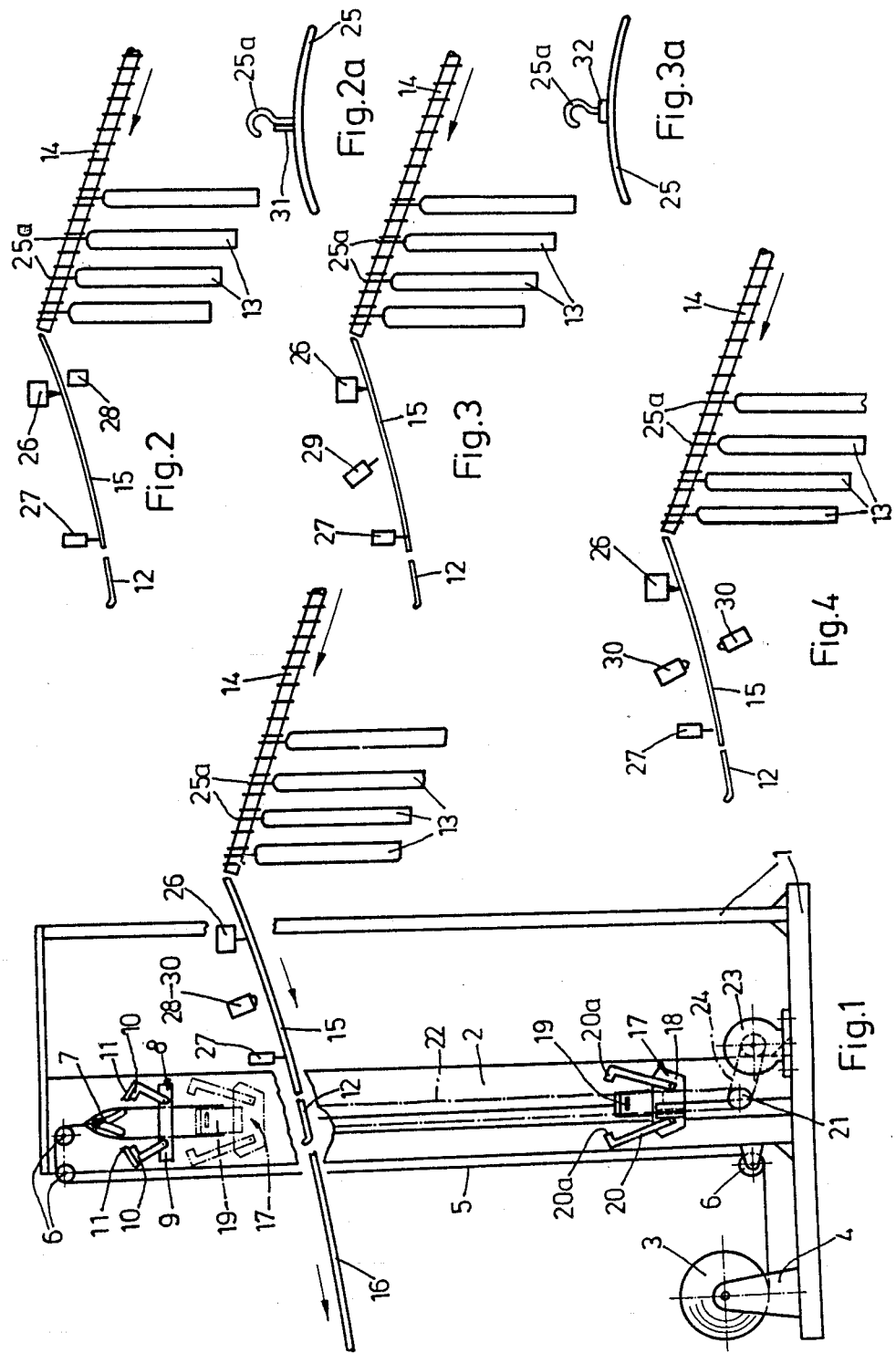
U.S. Patent    Nov. 7, 1989    Sheet 1 of 2    4,878,336

CONTROL DEVICE ON A PACKAGING MACHINE FOR SINGLE OR MULTIPLE PACKAGING OF HANGING ARTICLES OF CLOTHING

BACKGROUND OF THE INVENTION

The invention relates to a control device on a packaging machine for single and multiple packaging of articles of clothing hanging on coat hangers and to be jacketed and welded in a plastics tube film.

With the single packaging of articles of clothing known in the art, the articles of clothing conveyed by a feed screw are singled by a singling machine and then slide individually towards the packaging suspension device, in which they are covered from top to bottom in the hanging position in a tube film and are then welded at the top and also several times at the bottom.

If several articles of clothing are to be packed together in one tube film, the desired number of articles are in practice hung by hand in the packaging suspension device, which is expensive from the point of view of time and personnel and often leads to incorrect hanging.

OBJECT OF THE INVENTION

The problem on which the invention is based is therefore that of providing a control device for a packaging machine, which makes it possible to package automatically, precisely and in a failure free and rational manner single or multiple articles of clothing by predetermination of the number of articles and scanning.

The control device should be simply and economically constructed and flexible in the determination and recognition of the desired packaging article numbers.

SUMMARY OF THE INVENTION

These problems are solved according to the invention by the characterizing features of claim 1, the structural features indicated in subclaims 2 to 11 being advantageous modifications of the solution to the problems.

The subject matter of the invention extends not only to the features of the individual claims, but also to the combination thereof.

The control device according to the invention makes possible, by preselection magnetic scanning, colour scanning and photoelectric cell sensing, the single and multiple packaging of articles of clothing in an automatic, rational, precise and reliable working sequence.

The sensing method with preselection counter from 0 to X and magnetic scanning results in the packaging of desired, equal numbers of articles in each packaging unit and the number of articles of clothing remaining after the packaging unit are also packaged by means of the magnetic scanning.

The sensing method with colour scanning allows the packaging of different numbers of articles in the packaging units in one run.

The sensing method by means of photoelectric cells results in fixed bundle sizes, since the clothing articles sensed over an adjustable distance are always packed together in equal numbers as a unit.

The control device is very adaptable in its recognition and determination of article numbers.

Also advantageous is the simple, convenient and reliably operating singler, which makes possible the use of coat hangers and hooks very different in shape, cross section and size and thereby increases the value of the automatic packaging.

BRIEF DESCRIPTION OF THE DRAWINGS

Exemplary embodiments of the inventin are shown in the drawings and described in greater detail below. In the drawings:

FIG. 1 is a diagrammatic side view of a packaging machine with associated feed screw and control device with singler, stopper and scanner for single and multiple packaging of articles of clothing by means of tube film;

FIG. 2 is a diagrammatic side view of the control device operating with preselection counter and magnetic scanning;

FIG. 2a is a front view of a coat hanger with magnet;

FIG. 3 is a diagrammatic side view of the control device operating with colour scanning;

FIG. 3a is a front view of a coat hanger with colour ring;

FIG. 4 is a diagrammatic side view of the control device operating with photoelectric cells;

DETAIL DESCRIPTION OF PREFERRED EMBODIMENTS

Figure 5:
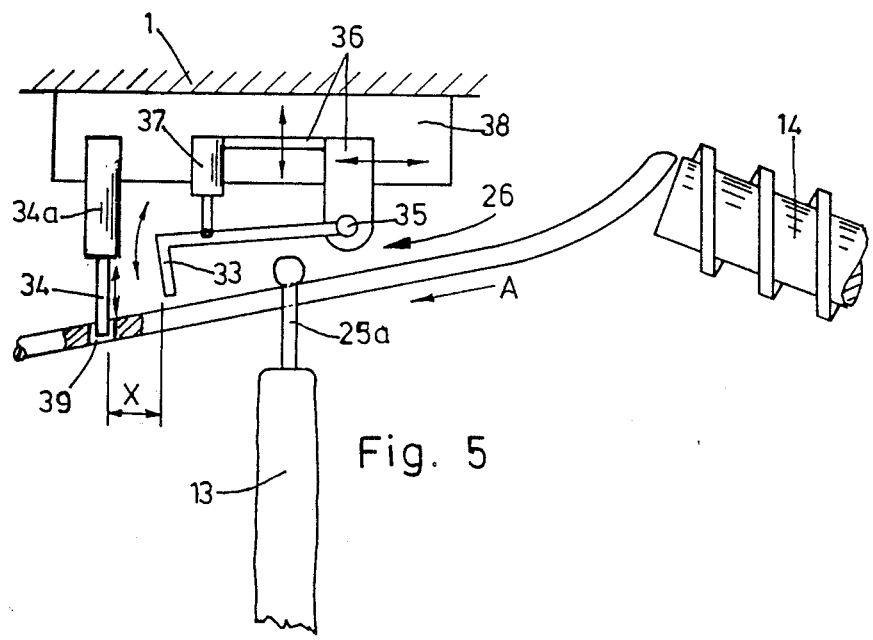
FIG. 5 is a diagrammatic side view of the feed screw and the singler mounted thereafter.

The reference numeral (1) is allocated to the frame of a packaging machine comprising two upright guides (2) arranged adjacent each other but at a distance from each other. A film roll (3) is accommodated rotatably and exchangeably on the guides (2) or the frame (1) in supports (4), a plastics tube film (5) being unwound from said film roll (3) and guided over corner pulleys (6) to the upper area of the guides (2).

In the upper machine frame area, between the guides (2), there is arranged an opening member (7), for example in the form of spreader spoons or the like, with which the tube film (5) arriving in a flat state is opened and held apart.

In the area of this opening member (7), between the guides (2), there is arranged a fixed welding and cutting device (8) for effecting an uppper packaging weld seam and separating the tube film (5) provided for the packaging from the tube film web. This welding and cutting device (8) comprises, on a support (9) supported on the guides (2), two welding bars (10) movable towards each other, spanning the whole width of the tube film and having cutting blades (11) arranged thereon.

Below this welding and cutting device (8) there is provided, in the machine frame (1), a packaging suspension device (12) for one or more articles of clothing (13) to be packaged, the tube film (5) being drawn from top to bottom over the hanging article(s) of clothing (13) in a vertical plane. The clothing articles (13) are transported into the machine frame (1) by a feed screw (14) supported on the machine frame (1) and over a running path (slide path) (15) provided between the feed screw (14) and suspension device (12) and at right angles to the tube film plane and delivered to the suspension device (12). The suspension device (12) adjoins the running path (15) as a separate part or forms the end of the running path (15). The suspension device (12) has associated with it an unloading device (16), such as rods, a screw or the like, by means of which the packaged clothing articles (13) are transported from the machine on the opposite side from the feed screw (14).

A bottom closure welding device (17) is held between the guides (2), is displaceable in the vertical direction and is formed of a film drawing carriage (18) with grippers (19) and a welding device (20) and is used to form the lower packaging weld seam.

The vertical motion of the drawing carriage (18) and thus of the whole bottom closure welding device (17) is effected by means of a chain (22) revolving endlessly over deflection pulleys (21) accommodated rotatably at the top and bottom of the guides (2), said chain (22) being driven by a drive motor (23), such as an electric motor, via a contact drive (24), preferably a chain drive.

The welding device (20) comprises two welding bars (20a) movable towards each other and extending over the whole width of the tube film, and the two grippers (19) consist of two nipper or spoon components movable towards each other.

Before the article(s) of clothing (13) to be packaged are introduced into the machine, the bottom closure welding device (17) travels upwards into its uppermost position, which lies above the suspension device (12). The article(s) of clothing (13) stored on the running path (15) are now released into the suspension device (12), so that the article(s) of clothing (13) are situated in the hanging packaging position.

The tube film (5) unwound from the roll (3) is opened by the upper opening member (7) and held apart in the manner of a packaging tube and the two welding bars (20a) of the upper welding and cutting device (17) are pivoted apart into the open position.

The two welding bars (20a) of the bottom closure welding device (17) are also situated, in the raised position of the bottom closure welding device (17), in the pivoted-apart open position (c.f. dash-dotted representation in FIG. 1).

The two grippers (19) of the bottom closure welding device (17) now seize the open film tube (5), pivot together and hold it at opposite points in open form. The bottom closure welding device (17) now travels downwards over the hanging article(s) of clothing (13) and draws the tube film (5) over the article(s) of clothing (13).

After a certain travel distance, where the bottom closure welding device (17) has not travelled completely downwards over the clothing articles (13), but rather is still positioned around the clothing articles (13), the travel movement of the bottom closure welding device (17) is interrupted and welding of the upper packaging weld seam and separation of the withdrawn tube film area forming the packaging means from the film path (5) are effected by the upper welding and cutting device (8).

The upper weld seam now lies at a distance above the shoulder area of the clothing articles (13).

After this operational step the bottom closure welding device (17) then travels further downwards until it is below the lower edge of the article(s) of clothing (13) and the packaging film tube is thereby also drawn downwards, so that the upper weld seam then comes to lie on the shoulder area of the clothing articles (13) and the article(s) of clothing (13) are covered by the film tube over its whole length. The grippers (19) now release the film tube at its lower end by pivoting apart and the weld bars (20a) pivot together to effect the lower weld seam.

Next, the bottom closure welding device (17) travels a little further downwards and releases the now packed clothing article(s) (13) enveloped completely by the tube film (5) and enclosed in its packaging at the top and bottom by a weld seam, so that they can be removed from the machine by the removal device (16). Thereafter, the bottom closure welding device (17) travels up again into the uppermost position and can begin a new packaging process.

To control single or multiple packaging, a control device is provided which comprises, in the area of the running path (15) of the clothing articles (13) hanging on coat hangers (25) between the feed screw (14) and the packaging suspension device (12), a singler (26) and a stopper (27) arranged at a distance therefrom, as well as a scanner (28/29/30) which registers the number of clothing articles (13) to be packaged by preselection by magnetic scanning, colour scanning or distance scanning and controls the singler (26) and stopper (27) for packaging preparation and packaging release.

According to FIGS. 2 and 2a the scanner (28) is formed of a solenoid switch interacting with a magnet (31) mounted on the coat hanger hook (25a). An adjustable preselection counter (adjustable from 0 to X) is associated with the magnetic scanner (28), which counter divides the prepared clothing articles (13) into the set packaging units, the solenoid switch (28) controlling the clothing articles (13) remaining from the number of each packaging unit for the last packaging process in dependence on the magnet (31) on the coat hanger (25).

If, for example, each packaging unit is to consist of four clothing articles (13), the singler (26) controlled by the preselection counter always allows only four clothing articles (13) to run over the running path (15) as far as the stopper (27), which then, under the control of the singler (26), releases the four clothing articles (13) for packaging.

With, for example, altogether twenty-six clothing articles (13) there would be six packaging processes each involving four clothing articles (13). The remaining two articles of clothing (13) are then also allowed through by the singler (26), the magnet (31) being mounted on the coat hanger hook (25a) of the last article of clothing (13). This is registered by the magnetic scanner (28) and the latter then controls the last packaging process with only two clothing articles (13), by imparting the release pulse to the stopper (27).

In the embodiment according to FIGS. 3 and 3a the scanner (29) is formed of a colour scanner arranged between the singler (26) and stopper (27), which colour scanner cooperates with a colour label (32), such as a coloured ring, on the coat hanger hook (25a). The colour labels (32) each result in a packaging unit of a different number of articles, determined according to the respective colour and read by the colour scanner (29). For example, a red colour label means five articles of clothing (13) in one packaging unit, green colour label = three articles of clothing (13), blue colour label = two articles of clothing (13) and yellow colour label = one article of clothing (13).

The colour scanner (29) registers the colour labels (32) on the coat hanger hooks (25a) and controls the singler (26) and stopper (27) accordingly.

According to the embodiment of FIG. 4 the scanner (30) is formed of photoelectric cells arranged between the singler (26) and stopper (27), which, on darkening of the path monitored thereby by the articles of clothing (13), release a fixed bundle thickness as a packaging unit for packaging by control of the stopper (27).

The length of the path monitored by the photoelectric cells (30) between the singler (26) and stopper (27) is adjustable, such that the bundle thicknesses of clothing articles (13) can be varied; to this end the singler (26) can be adjusted in its separation from the stopper (27), for example.

In FIG. 5 the singler (26) is shown in more detail; it comprises, above the running path (15), a vertically displaceable, preferably angular singling hook (33), which can be lowered on the running path (15) to arrest the clothing article movement and raised to release the clothing article (13)—the coat hanger hook (25a) thereof—from the running path (15), and a stopper (34) arranged in the sliding direction "A" of the clothing articles (13) at a distance therebehind, which stopper (34) can also be vertically displaced with respect to the running path (15) to halt and let through the coat hanger hooks (25a).

The singling hook (33) is held vertically displaceably with one end around a shaft (35) on a bearing member (36) and, at a distance from the shaft (35), a lifting member (37), preferably the piston rod of a pressure medium cylinder, acts articulatedly on the singling hook (33), said lifting member also being supported by the bearing member (36). The singling hook (33) and lifting member (37) are secured to a support (38) of the machine frame (1) by means of the bearing member (36) as a unit at a distance "X" from the stopper (34) and so as to be steplessly vertically adjustable with respect to the running path (15).

The stopper (34) is preferably formed of the piston rod of a pressure medium cylinder (34a) and engages in the locking position (shown in FIG. 5) in a hole (39) or the like in the running path (15), from which it can be displaced upwards to release the coat hanger hooks (25a).

Between the singling hook (33) and stopper (34) only one coat hanger hook (25a) is ever singled.

This singler (26) is espeically suitable for coat hangers (25) of plastics material, the hooks (25a) of which may have various cross sections and sizes, such as circular, T-shaped, double T-shaped, flat edged or triangular cross sections, the distance "X" being adjusted to correspond to the hook (25a), so that only one hook (25a) ever fits into this separation area "X".

The feed screw (14) is arranged on an upwards incline and the running path (15) on a downwards incline.

Figure 6:
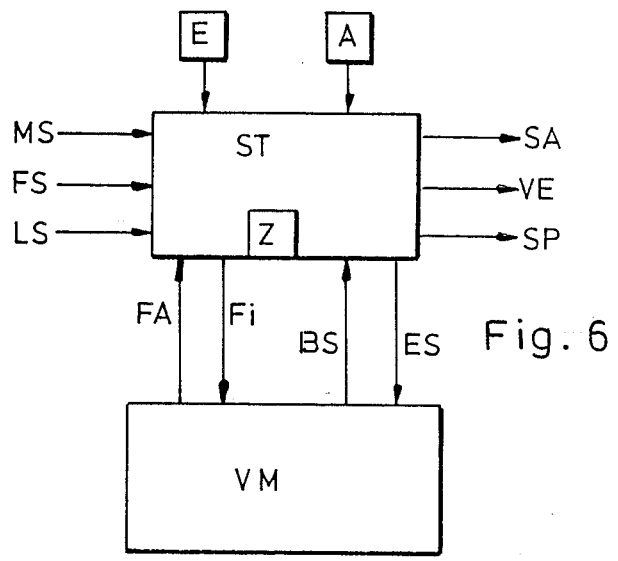
FIG. 6 is a circuit diagram of the program control for single and multiple packaging.

FIG. 6 shows the program control ST with the input E, a counter Z, the input signal MS for magnetic scanning, the input signal FS for colour scanning and the input signal LS for photoelectric cell scanning, the output signal SA for the screw drive, the output signal VE for the singler (26) and the output signal SP for the stopper (27).

Fi is the ready pulse of the control ST to the packaging machine VM and BS is the standby signal of the packaging machine VM to the control ST and ES the end signal of the control ST to the packaging machine VM after completion of packaging.

Furthermore, the control ST is equipped with a display A by the packaging program, which display A indicates the packaging type with preselection magnetic scanning, colour scanning or photoelectric cell scanning.

1. Program (preselection counter with magnetic scanning)

With the input E this program is input into the control ST and in the counter Z the number of articles in the desired multiple package (two, three, five or more articles for each packaging unit) is set.

The control ST then delivers the ready pulse Fi to the packaging machine VM and the latter delivers the standby signal BS for packaging to the control ST and the screw drive is switched on by the drive signal SA and the feed screw (14) conveys the articles of clothing (13) onto the running path (15). The singler (26) is controlled by the preselection counter Z until the set number of articles of clothing hangs between the singler (26) and the stopper (27). Then the stopper (27) releases this number of articles for packaging and the articles of clothing (13) slide onto the packaging suspension device (12).

If fewer articles of clothing (13) arrive on the running path (15) than the set number—i.e. the residual articles of clothing (13)—, the magnetic scanner (28) recognizes the end of the packaging load from the magnets (31) of the last article of clothing (13) and controls the stopper (27) for packaging release of these articles of clothing (13) and the output signal SA switches the screw drive off. The control ST delivers the end signal ES to the packaging machine VM and its packaging means are also switched off.

2. Program (colour scanning for different numbers of articles)

With the input, this program is input into the control ST, the specific colours determining the respective numbers of articles for single and/or multiple packaging.

The control ST then delivers the read pulse Fi to the packaging machine VM and this delivers the standby signal BS to the control ST. The feed screw (14) is switched on and conveys articles of clothing (13) onto the running path (15).

The colour scanner (29) scans the colour labels (32) on the coat hanger hooks (25a) and alternately delivers a colour signal FS to the singler (26) and stopper (27) for singling and release of the number of articles of the corresponding colour labels (32), so that the colour predetermined for each number of articles results in the unit to be packaged (single or multiple packaging).

If no more articles of clothing (13) arrive on the running path (15), the control ST delivers the end signal ES to the packaging machine VM.

3. Program (photoelectric cell control for fixed bundle thicknesses)

With the input E the program is input into the control ST, the program is displayed on the display A and the ready pulse Fi and the standby signal BS are replaced.

The screw drive receives its drive signal AS and the screw (14) conveys articles of clothing (13) between the singler (26) and the stopper (27). If the path monitored by the photoelectric cells (30) is darkened, the singler (26) receives a locking light signal LS and the stopper (27) receives a release light signal LS and the fixed bundle of clothing articles (13) can slide on for packaging.

If no clothing articles (13) are supplied, the control ST delivers the end signal ES to the packaging machine VM and the screw (14) is switched off.

These three programs also each control alternately the singling hook (33) and stopper (34) of the singler (26), such that only one article of clothing (13) is ever singled and delivered onto the running path (15) to the stopper (27), precise and problem free singling and release thereby being ensured.

FA is signal information from the packaging machine to the program ST, if incorrect tube film (5) is introduced into the packaging machine VM.

The control device can form an independent unit arranged on the packaging machine and connected with the control thereof or it can be integrated into the control of the packaging machine.

The packaging machine may furthermore be equipped without the bottom closure welding device (17); in this case the drawing carriage (18) for drawing down the film is provided with the grippers (19).

We claim:

1. A control device on a packaging machine for jacketing and welding in a tubular film of plastics material articles of clothing hanging on coat hangers in single and multiple packages including:
   (a) a worm conveyor for conveying the hanging items of clothing to an output end thereof;
   (b) downwardly inclined sliding track having an input end connected to the output end of the worm conveyor on which the hanging articles of clothing slide individually into the packaging machine;
   (c) a suspension unit in the packaging machine to which the sliding track leads and into which one or more articles of clothing on their hangers slide;
   (d) a clothing article unit separator associated with the sliding track at its input end;
   (e) a clothing article stopping device associated with the sliding track at its output end;
   (f) and a detector and controller arranged to control the unit separator so as to retain suspended articles of clothing from the worm conveyor and release them individually down the sliding track, and additionally control the clothing article stopper for retaining suspended articles of clothing on the sliding track outside the suspension unit and then release one or more articles of clothing simultaneously into the suspension unit as required;
   (g) the detector acting either by virtue of magnetic detection of the last of a preset number of clothes hangers at the separator and stopper, or by means of colour scanning detection of the clothes hanger, or by means of one or more photocells arranged to detect and count the preset number of articles of clothing.

2. A control device according to claim 1 in which the unit separator includes an angular separating hook mounted such as to be vertically moveable above the running path between a lower position preventing movement therepast of clothes hangers on the sliding track, and an upper release position permitting movement therepast of coat hangers on the sliding track, and the stopper being vertically moveable between a stopping and a release position.

3. A control device according to claim 2 in which the unit separator hook is mounted on a support and is actuable by means of a fluid operated piston and cyliner whereby to effect its vertical displacement, the support being adapted to be moveable with respect to its distance from the stopper, and in its disposition with respect to the sliding track to accommodate coat hangers of different dimensions.

4. A control device according to claim 2 in which the stopper comprises a rod from the piston of the pressure medium cylinder and piston set, the sliding track being provided with an aperture within which the piston rod engages in the clothing article stopping position of the stopper.

5. A control device according to claim 1 in which the detector comprises a colour scanner device disposed adjacent the sliding track between the unit separator and the stopper, the coat hangers being provided with coloured labels for actuation of the colour scanner.

6. A control device according to claim 5 in which the colour scanner is arranged to actuate the stopper to produce packaging units of clothing articles of predetermined numbers in dependence on readings of the colours of successive colours labels.

7. A control device according to claim 1 in which the detector comprises at least one photo-electric cell disposed in relation to the sliding track between the unit separator and the stopper.

8. A control device according the claim 7 in which the photo-electric cells are arranged to control the stopper to release therepast a predetermined number of clothing articles as single packaging units upon the darkening of a light path monitored thereby.

9. A control device according to claim 1 in which the detector comprises a counter device and a solenoid switch associated therewith and operable on a preselected number of counts, the solenoid switch being associated with the unit separator, the coat hangers each carrying a magnet which co-operates with the unit separator.

10. A control device according to claim 9 in which the counter mechanism is preselectable at from 0 to X articles of clothing and is arranged to sort the prepared articles of clothing into preset units for packaging, and the solenoid switch is arranged to control articles of clothing so as to hold them at the stopper after the progression therepast of the preceding packaging unit of clothing articles in dependence on the coat hangers magnets.

11. A control device according to claim 1 including an operational programme control having a programme input, a packaging programme display, a counter, inputs for magnetic scanning, colour scanning, and photo-electric cell scanning, outputs for worm conveyor control, unit separator control, and the stopper control, together with outputs connectable to the packaging machine, for signals indicating the readiness of packaging units in clothing articles, and inputs connectable to the packaging machine for signals indicative of the completion of a packaging unit of clothing articles by the packaging machine, and packaging machines standby signals, together with end of operation signals to the packaging machine.

* * * * *